(12) United States Patent
Botu et al.

(10) Patent No.: US 12,252,437 B2
(45) Date of Patent: Mar. 18, 2025

(54) ANTI-REFLECTION AND ANTI-GLARE GLASS LAMINATES

(71) Applicant: CORNING INCORPORATED, Corning, NY (US)

(72) Inventors: Venkatesh Botu, Corning, NY (US); Attila Lang de Falussy, Elmira, NY (US); Jin Su Kim, Seoul (KR); Karl William Koch, III, Elmira, NY (US); Aize Li, Painted Post, NY (US); James Patrick Trice, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 211 days.

(21) Appl. No.: 17/924,142

(22) PCT Filed: May 5, 2021

(86) PCT No.: PCT/US2021/030834
§ 371 (c)(1),
(2) Date: Nov. 9, 2022

(87) PCT Pub. No.: WO2021/231146
PCT Pub. Date: Nov. 18, 2021

(65) Prior Publication Data
US 2023/0271875 A1    Aug. 31, 2023

Related U.S. Application Data

(60) Provisional application No. 63/024,784, filed on May 14, 2020.

(51) Int. Cl.
*B32B 15/04*    (2006.01)
*B32B 3/30*    (2006.01)
(Continued)

(52) U.S. Cl.
CPC ............. *C03C 17/02* (2013.01); *B32B 3/30* (2013.01); *B32B 7/027* (2019.01); *B32B 17/06* (2013.01);
(Continued)

(58) Field of Classification Search
CPC .......................... B32B 17/06; C03C 11/005
(Continued)

(56) References Cited

U.S. PATENT DOCUMENTS 9,393,760 B2 * 7/2016 He ..................... B32B 17/06
9,487,440 B2 * 11/2016 Miyasaka ............ C03C 21/002
(Continued)

FOREIGN PATENT DOCUMENTS

| CN | 103221356 A | 7/2013 |
|---|---|---|
| WO | 2013/140717 A2 | 9/2013 |
| WO | 2019/074888 A1 | 4/2019 |

OTHER PUBLICATIONS

Chinese Patent Application No. 202180044860.3, Office Action dated Sep. 29, 2024, 4 pages (English Translation only), Chinese Patent Office.
(Continued)

*Primary Examiner* — Lauren R Colgan
(74) *Attorney, Agent, or Firm* — Russell S. Magaziner

(57) ABSTRACT

A method of forming a glass laminate includes providing a substrate having a core layer and at least one cladding layer; heat treating the substrate at a temperature such that the at least one cladding layer is phase-separated after the heat treating; and etch treating the substrate for at least 10 sec. A phase-separated glass laminate includes a substrate having a core layer and at least one phase-separated cladding layer, such that the glass laminate has a % transmission of at least
(Continued)

96%, and the at least one cladding layer comprises a grain size in a range of 10 nm to 1 μm, or a graded glass index of greater than 5 nm.

20 Claims, 8 Drawing Sheets

(51) Int. Cl.
| | |
|---|---|
| B32B 7/027 | (2019.01) |
| B32B 17/06 | (2006.01) |
| C03C 3/091 | (2006.01) |
| C03C 11/00 | (2006.01) |
| C03C 15/00 | (2006.01) |
| C03C 17/02 | (2006.01) |
| C03C 23/00 | (2006.01) |

(52) U.S. Cl.
CPC ............ *C03C 3/091* (2013.01); *C03C 11/005* (2013.01); *C03C 15/00* (2013.01); *C03C 23/007* (2013.01); *B32B 2250/03* (2013.01); *B32B 2250/40* (2013.01); *B32B 2307/412* (2013.01); *B32B 2307/7376* (2023.05); *C03C 2217/734* (2013.01)

(58) Field of Classification Search
USPC .................................................. 428/428, 410
See application file for complete search history.

(56) References Cited

U.S. PATENT DOCUMENTS

| | | | | |
|---|---|---|---|---|
| 10,259,739 | B2* | 4/2019 | He | C03C 1/004 |
| 10,357,945 | B2* | 7/2019 | Beall | C03B 32/02 |
| 10,710,927 | B2* | 7/2020 | Amosov | C03C 3/093 |
| 11,351,756 | B2* | 6/2022 | Dejneka | B32B 17/101 |
| 2011/0092353 | A1* | 4/2011 | Amin | C03C 10/16 |
| | | | | 501/3 |
| 2011/0151222 | A1* | 6/2011 | Oudard | B32B 27/308 |
| | | | | 427/165 |
| 2012/0196735 | A1* | 8/2012 | Bogaerts | C03C 10/0009 |
| | | | | 977/773 |
| 2013/0157026 | A1* | 6/2013 | Kotani | C03C 3/091 |
| | | | | 501/53 |
| 2013/0216775 | A1* | 8/2013 | Sugiyama | C03C 17/02 |
| | | | | 428/138 |
| 2013/0333419 | A1* | 12/2013 | Koketsu | C03B 32/00 |
| | | | | 65/31 |
| 2014/0242375 | A1* | 8/2014 | Mauro | C03B 17/02 |
| | | | | 65/53 |
| 2014/0305166 | A1* | 10/2014 | Koketsu | G02B 5/3008 |
| | | | | 65/31 |
| 2015/0198752 | A1* | 7/2015 | Lander | C03C 17/007 |
| | | | | 359/601 |
| 2015/0251383 | A1* | 9/2015 | Beall | B32B 17/06 |
| | | | | 428/428 |
| 2015/0299035 | A1* | 10/2015 | Kuksenkov | G02B 1/118 |
| | | | | 65/17.2 |
| 2016/0102010 | A1* | 4/2016 | Beall | C03C 21/002 |
| | | | | 501/4 |
| 2016/0194235 | A1* | 7/2016 | Hart | C03B 17/064 |
| | | | | 65/33.1 |
| 2017/0240460 | A1* | 8/2017 | Boek | B32B 7/027 |
| 2019/0030861 | A1* | 1/2019 | Bellman | C03B 17/02 |
| 2020/0238797 | A1* | 7/2020 | Bard | G02B 1/111 |
| 2024/0158292 | A1* | 5/2024 | Botu | C03C 17/02 |

OTHER PUBLICATIONS

International Search Report and Written Opinion of the International Searching Authority; PCT/US2021/030834; dated Sep. 9, 2021; 11 pages; European Patent Office.

* cited by examiner

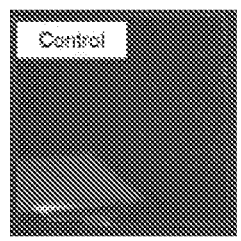
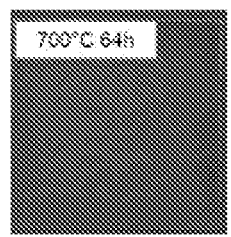
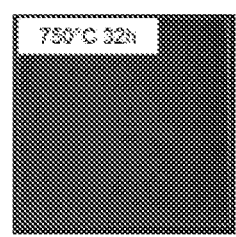
FIG. 4A　　　　　FIG. 4B　　　　　FIG. 4C
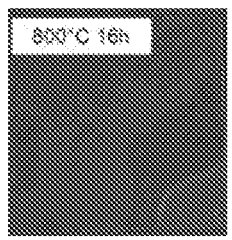
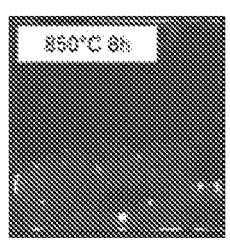
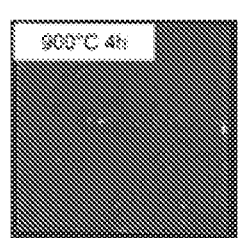
FIG. 4D　　　　　FIG. 4E　　　　　FIG. 4F
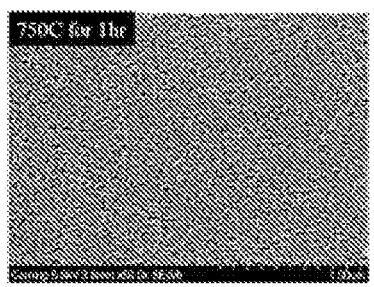
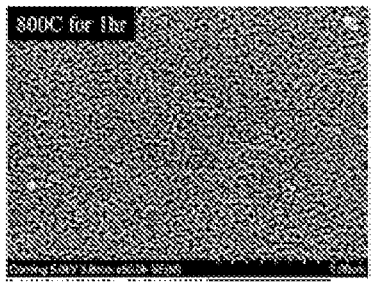
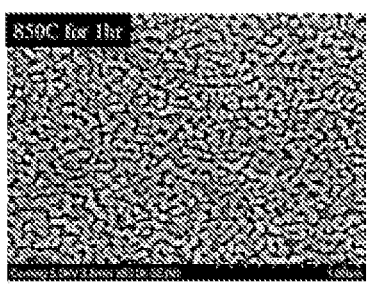
FIG. 5A　　　　　FIG. 5B　　　　　FIG. 5C
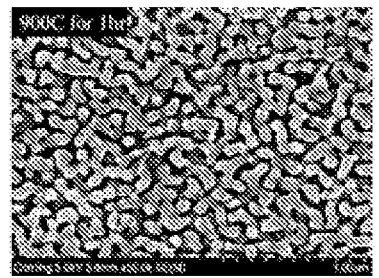
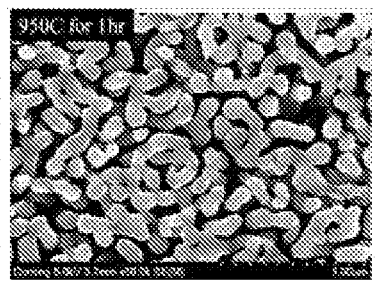
FIG. 5D　　　　　FIG. 5E

ANTI-REFLECTION AND ANTI-GLARE GLASS LAMINATES

This application claims the benefit of priority under 35 U.S.C. § 371 of International Application No. PCT/US2021/030834, filed on May 5, 2021, which claims priority under 35 U.S.C. § 119 (e) from U.S. Provisional Patent Application Ser. No. 63/024,784, filed on May 14, 2020, which is incorporated by reference herein in its entirety.

BACKGROUND

1. Field

This disclosure relates to anti-reflection (AR) and anti-glare (AG) glass laminates with improved optical performance.

2. Technical

Reflection of light on non-AR coated glass surfaces occurs at the air-glass interface and may be up to 8% of light reflected at normal incidence, as predicted from the Fresnel equation. Conventional technologies to minimize reflection include using AR coatings disposed on glass surfaces to reduce intensity of the reflected light. Anti-reflective coatings often comprise of layer(s) of multiple low- and high-index materials that destructively interfere different reflections within the stack. An alternative to AR coatings is AG processing by etch patterning a surface of the glass, textured coatings, or bulk scatterers such that incoming light is scattered away from specular directions.

However, both traditional AR and AG techniques (A) suffer from cost and time limitations (e.g., AR coatings often require multiple coatings of varying compositions); (B) can be difficult to control; and (C) are challenging to jointly optimize (i.e., AR coatings and AG features may cancel the effects of each individually).

The present application discloses improved anti-reflection (AR) and anti-glare (AG) glass laminates having enhanced optical performance in display and sensor applications.

SUMMARY

In some embodiments, a method of forming a glass laminate, comprises: providing a substrate having a core layer and at least one cladding layer; heat treating the substrate at a temperature such that the at least one cladding layer is phase-separated after the heat treating; and etch treating the substrate for at least 10 sec.

In one aspect, which is combinable with any of the other aspects or embodiments, the substrate is formed via a fusion lamination process.

In one aspect, which is combinable with any of the other aspects or embodiments, the core layer is an amorphous core layer and the at least one cladding layer is an amorphous cladding layer prior to the heat treating.

In one aspect, which is combinable with any of the other aspects or embodiments, the heat treating is conducted at a temperature in a range of 400° C. to 1300° C.

In one aspect, which is combinable with any of the other aspects or embodiments, the heat treating is conducted for a time in a range of 1 min to 200 hrs.

In one aspect, which is combinable with any of the other aspects or embodiments, the heat treating is conducted for a time in a range of 4 hrs to 64 hrs.

In one aspect, which is combinable with any of the other aspects or embodiments, the etch treating is conducted for a time in a range of 1 sec to 24 hrs.

In one aspect, which is combinable with any of the other aspects or embodiments, the etching is conducted using a wet chemical etchant selected from at least one of: HCl, $HNO_3$, $H_2SO_4$, $H_3PO_4$, $H_3BO_3$, HBr, $HClO_4$, HF, acetic acid, citric acid, $NH_4F$, ammonium bifluoride acid, LiOH, NaOH, KOH, RbOH, CsOH, $Ca(OH)_2$, $Sr(OH)_2$, $Ba(OH)_2$, $H_2O$, or combinations thereof.

In one aspect, which is combinable with any of the other aspects or embodiments, the etchant is present at a concentration of at least 0.1 vol. % of the total solution volume.

In one aspect, which is combinable with any of the other aspects or embodiments, the etchant is present at a concentration in a range of 0.25 vol. % to 5 vol. % of the total solution volume.

In one aspect, which is combinable with any of the other aspects or embodiments, the etching is conducted using dry etching processes selected from at least one of ion beam etching, plasma etching, reactive ion etching, or combinations thereof.

In one aspect, which is combinable with any of the other aspects or embodiments, the phase-separated at least one cladding layer has a grain size in a range of 10 nm to 1 μm.

In one aspect, which is combinable with any of the other aspects or embodiments, the at least one cladding layer and the core layer are phase-separated after the heat treating.

In one aspect, which is combinable with any of the other aspects or embodiments, a grain size of the phase-separated at least one cladding layer is less than a grain size of the phase-separated core layer.

In some embodiments, a phase-separated glass laminate, comprises: a substrate having a core layer and at least one phase-separated cladding layer, wherein the glass laminate has a % transmission of at least 96%, and wherein the at least one cladding layer comprises a grain size in a range of 10 nm to 1 μm, or a graded glass index of greater than 5 nm.

In one aspect, which is combinable with any of the other aspects or embodiments, the core layer is a phase-separated core layer.

In one aspect, which is combinable with any of the other aspects or embodiments, a grain size of the at least one phase-separated cladding layer is less than a grain size of the phase-separated core layer.

In one aspect, which is combinable with any of the other aspects or embodiments, the glass laminate has a % transmission of at least 98% and a distinctness of image of less than 30%.

In one aspect, which is combinable with any of the other aspects or embodiments, the at least one cladding layer has a graded glass index in a range of 1 μm to 5 μm.

In one aspect, which is combinable with any of the other aspects or embodiments, the at least one cladding layer has an average coefficient of thermal expansion ($CTE_{CLAD}$) different from an average coefficient of thermal expansion of the core layer ($CTE_{CORE}$).

BRIEF DESCRIPTION OF THE DRAWINGS

The disclosure will become more fully understood from the following detailed description, taken in conjunction with the accompanying figures, in which:

FIGS. 4A-4F illustrate images of the cladding portion of the laminate after heat treatment at various times and temperatures, according to some embodiments.

FIGS. 5A-5E illustrate scanning electron microscopy (SEM) images of phase separation in the cladding portion of the laminate after heat treatment at various times and temperatures, according to some embodiments.

DETAILED DESCRIPTION

Figure 1:
FIG. 1 illustrates a three-layered substrate comprising a core layer interposed between a first cladding layer and a second cladding layer, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Definitions

Percent (%) transmittance is defined as the percentage of incident light that passes through a thickness of a material. Percent (%) reflectance is defined as the percentage of incident light that is reflected from an interface, as the light propagates from one medium to another, e.g., air to glass. Both % transmittance and % reflectance may also be defined for a system of multiple interfaces, including discontinuous and gradient interfaces.

Distinctness of image (DOI) is a quantification of the deviation of the direction of light propagation from the regular direction by scattering during transmission or reflection.

Gloss is defined as a measurement, proportional to the amount of light reflected from a surface, determining how shiny a surface appears. Haze causes a drop in reflected contrast and causes halos to appear around light sources; these unwanted effects dramatically reduce visual quality. Phase separation is defined as the separation of a homogenous medium into two or more distinct homogenous materials, often with different chemistries. Glass index is defined as the index of refraction of a material.

Coefficient of thermal expansion (CTE) is defined as the coefficient of thermal expansion of a glass composition averaged over a temperature range from about 20° C. to about 300° C.

"Include," "includes," or like terms means encompassing but not limited to, that is, inclusive and not exclusive.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

For example, in modifying the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, "about" or similar terms refer to variations in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" (or similar terms) also encompasses amounts that differ due to aging of a composition or formulation with a particular initial concentration or mixture and amounts that differ due to mixing or processing a composition or formulation with a particular initial concentration or mixture.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions, articles, and methods of the disclosure can include any value or any combination of the values, specific values, more specific values, and preferred values described herein, including explicit or implicit intermediate values and ranges.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

As explained above, conventional technologies to minimize reflections on glass surfaces include using AR coatings and AR texturing. However, both traditional AR and AG techniques (A) suffer from cost and time limitations (e.g., AR coatings often require multiple coatings of varying compositions); (B) can be difficult to control; and (C) are challenging to jointly optimize (i.e., AR coatings and AG features may cancel the effects of each individually).

In the present disclosure, a new means of using a cladding layer of a laminate glass as an AR/AG surface is described. To achieve this goal, phase separation chemistry of the cladding layer in AR applications is exploited using a two-step process (including etching). For AG applications, only a one-step process is needed (no etching). Thus, laminate glasses in AG applications may be formulated with larger grain sizes in the core layer and smaller grain sizes in the cladding layer, as compared with glass laminates in AR applications. Heat treatment and surface etching cycles are developed that enable formation of gradient-index type materials with improved optical performance (e.g., about 1% total reflectance, lower gloss, and lower DOI on the surface) for display applications (e.g., automotive interiors, laptop covers, smartwatches, etc.). The laminated structure of the glass is stronger than a single glass system. In some embodiments, at least one of the cladding layer, core layer, or a combination thereof may be phase-separated at different grain sizes to optimize design for application-specific cover glasses.

Turning now to the figures, FIG. 1 illustrates a three-layered substrate (i.e., laminate) comprising a core layer 102 interposed between a first cladding layer 104a and a second cladding layer 104b, according to some embodiments. The core layer 102, first cladding layer 104a, and second cladding layer 104b comprise, independently, glass-based materials (e.g., glass materials, glass-ceramic materials, ceramic materials, or combinations thereof). In some embodiments, the core layer 102 comprises a glass composition different from the glass composition of the first cladding layer 104a and the second cladding layer 104b. The first cladding layer 104a and the second cladding layer 104b may be formed from a first cladding glass composition and a second cladding glass composition, respectively. In some embodiments, the first cladding glass composition and the second cladding glass composition may be the same material. In other embodiments, the first cladding glass composition and the second cladding glass composition may be different materials.

FIG. 1 illustrates the core layer 102 having a first surface 102a and a second surface 102b opposed to the first surface 102a. A first cladding layer 104a is fused directly to the first surface 102a of the core layer 102 and a second cladding layer 104b is fused directly to the second surface 102b of the core layer 102. The glass cladding layers 104a and 104b may be fused to the core layer 102 without any additional materials, such as adhesives, polymer layers, coating layers or the like being disposed between the core layer 102 and the cladding layers 104a and 104b. Thus, in this instance, the first surface 102a of the core layer 102 is directly adjacent the first cladding layer 104a, and the second surface 102b of the core layer 102 is directly adjacent the second cladding layer 104b. In some embodiments, the core layer 102 and the glass cladding layers 104a and 104b are formed via a fusion lamination process (e.g., fusion draw process). Diffusive layers (not shown) may form between the core layer 102 and the cladding layer 104a, or between the core layer 102 and the cladding layer 104b, or both.

The first and second cladding layers may be any composition that phase separates in a spinodal manner that creates a porous matrix. For example, the first and second cladding layers may be formed from a composition comprising silicon dioxide ($SiO_2$) having a concentration in a range of 45 wt. % to 75 wt. % (e.g., ~60 wt. %), alumina ($Al_2O_3$) having a concentration in a range of 8 wt. % to 19 wt. % (e.g., ~12 wt. %), boron trioxide ($B_2O_3$) having a concentration in a range of 5 wt. % to 23 wt. % (e.g., ~18 wt. %), alkali oxides (e.g., $Li_2O$, $Na_2O$, $K_2O$, $Rb_2O$, etc.) having a concentration in a range of 3 wt. % to 21 wt. %, and alkaline earth oxides (e.g., MgO (~1-5 wt. %), CaO (~1-10 wt. %), SrO (~1-5 wt. %), etc.) having a concentration in a range of 1 wt. % to 15 wt. %. The cladding layers may be substantially free of arsenic (As) and cadmium (Cd) to provide that the degradation rate of the cladding layers is at least ten times greater than the degradation rate of the core layer. In some examples, the cladding layer may be a high $B_2O_3$-containing aluminosilicate glass. A thickness of the first cladding layer and the second cladding layer may each, independently, be in a range of 50 μm to 1000 μm, or 50 μm to 750 μm, or 50 μm to 500 μm (e.g., 400 μm), or 50 μm to 250 μm, or 100 μm to 750 μm, or 150 μm to 600 μm, or 200 μm to 500 μm, or 500 μm to 1000 μm, or 500 μm to 750 μm, or 750 μm to 1000 μm, or any value or range disclosed therein.

The core layer may be formed from at least one of an alkaline earth boro-aluminosilicate glass (e.g., Corning Eagle XG®), Corning FotoForm® Glass, Corning Iris™ Glass, or Corning Gorilla® Glass. For example, the core layer may be formed from a glass having a composition of 79.3 wt. % $SiO_2$, 1.6 wt. % $Na_2O$, 3.3 wt. % $K_2O$, 0.9 wt. % $KNO_3$, 4.2 wt. % $Al_2O_3$, 1.0 wt. % ZnO, 0.0012 wt. % Au, 0.115 wt. % Ag, 0.015 wt. % $CeO_2$, 0.4 wt. % $Sb_2O_3$, and 9.4 wt. % $Li_2O$. In some examples, the core layer may be formed from a glass composition falling within the ranges as described above for the first and second cladding layers. For example, the core layer may be formed from a glass having a composition of 56.57 wt. % $SiO_2$, 16.75 wt. % $Al_2O_3$, 10.27 wt. % $B_2O_3$, 4.54 wt. % CaO, 3.18 wt. % $K_2O$, 3.79 wt. % MgO, 4.74 wt. % SrO. In some embodiments, the core layer comprises at least one of Corning Eagle XG© Glass or Corning Iris' Glass, for example, due to their ultra-low auto-fluorescence. A thickness of the core layer may be in a range of 1 μm to 200 μm, or 5 μm to 150 μm, or 10 μm to 100 μm (e.g., 50 μm), or 25 μm to 75 μm, or 100 μm to 200 μm, or 100 μm to 150 μm, or 150 μm to 200 μm, or 1 μm to 100 μm, or 1 μm to 50 μm, or 50 μm to 100 μm, or any value or range disclosed therein. The core layer provides structural strength to the cladding layer through a stress concentration layer at the core layer/cladding layer interface.

In some examples, the core layer may be formed from glass compositions which have an average coefficient of thermal expansion ($CTE_{CORE}$) greater than or equal to about $40 \times 10^{-7}/°$ C. in a range from 20° C. to 300° C. In some examples, the average $CTE_{CORE}$ of the glass composition of the core layer may be greater than or equal to about $60 \times 10^{-7}/°$ C. in a range from 20° C. to 300° C. In some examples, the average $CTE_{CORE}$ of the glass composition of the core layer may be greater than or equal to about $80 \times 10^{-7}/°$ C. averaged over a range from 20° C. to 300° C. In some examples, the first and second cladding layers have an average coefficient of thermal expansion ($CTE_{CLAD}$) different from the average coefficient of thermal expansion of the core layer ($CTE_{CORE}$). In some examples, the first and second cladding layers have an average coefficient of thermal expansion ($CTE_{CLAD}$) lower than the average coefficient of thermal expansion of the core layer ($CTE_{CORE}$). In some examples, the first and second cladding layers have an average coefficient of thermal expansion ($CTE_{CLAD}$) higher than the average coefficient of thermal expansion of the core layer ($CTE_{CORE}$).

Figure 2:
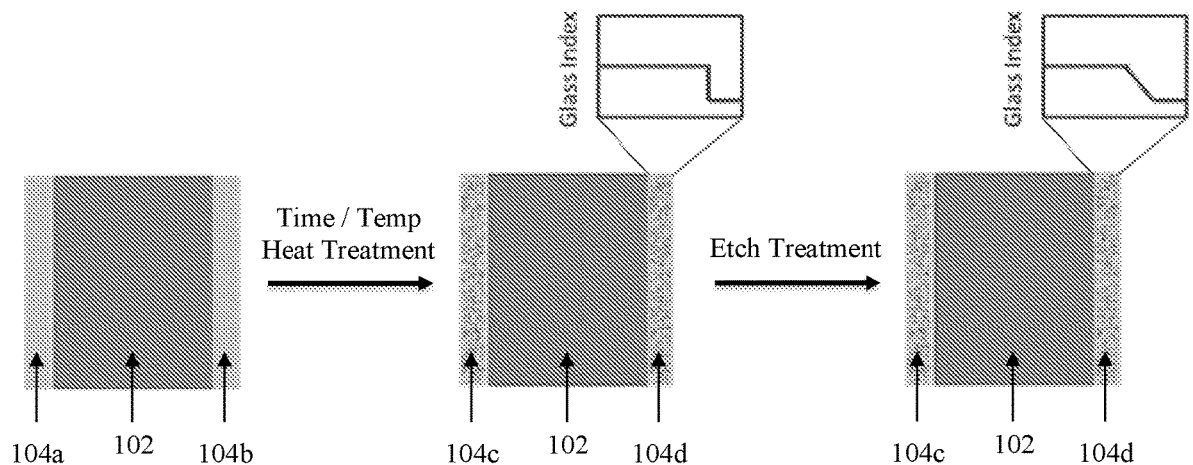
FIG. 2 illustrates a fusion-drawn laminated glass treatment process, according to some embodiments.

FIG. 2 illustrates a fusion-drawn laminated glass treatment process, according to some embodiments. Slope change of the glass index (insert) indicates a gradient-index effect on the surface, which is responsible for minimization of Fresnel reflections on the surface. The initial, fusion-drawn glass laminate is equivalent to the structure described in FIG. 1 above having at least one amorphous cladding layer (one or both) and an amorphous core layer. Through a first heat treatment step, the cladding layers 104a and 104b phase separates into cladding layers 104c and 104d while the core layer 102 remains amorphous.

Step 1—Heat Treatment

The heat treatment may be conducted in a Thermo Scientific Furnace (PDL) starting at room temperature and ramped up to the predetermined temperature. Samples were heated for 1 min to 60 min (e.g., 20 min) and then cooled thereafter by quenching on a cooling bench. In some examples, phase separation may also be induced by heat, e-beam, laser, or combinations thereof.

In some examples, the heat treatment may be conducted at a temperature in a range of 400° C. to 1300° C., or 450° C. to 1250° C., or 500° C. to 1200° C., or 550° C. to 1150° C., or 600° C. to 1100° C., or 650° C. to 1050° C., or 700° C. to 1000° C., or 400° C. to 700° C., or 450° C. to 650° C., or 1000° C. to 1200° C., or 1050° C. to 1150° C., or 725° C. to 975° C., or 750° C. to 950° C., or 775° C. to 925° C., or 800° C. to 900° C., or 700° C. to 850° C., or 850° C. to 1000° C., or any intervening value or range disclosed therein. In some examples, the heat treatment may be conducted at a temperature of 400° C., or 425° C., or 450° C., or 475° C., or 500° C., or 525° C., or 550° C., or 575° C., or 600° C., or 625° C., or 650° C., or 675° C., or 700° C., or 725° C., or 750° C., or 775° C., or 800° C., or 825° C., or 850° C., or 875° C., or 900° C., or 925° C., or 950° C., or 975° C., or 1000° C., or 1025° C., or 1050° C., or 1075° C., or 1100° C., or 1125° C., or 1150° C., or 1175° C., or 1200° C., or 1225° C., or 1250° C., or 1275° C., or 1300° C., or any intervening value disclosed therein.

In some examples, the heat treatment may be conducted at a time in a range of 1 min to 200 hrs, 0.1 hr to 100 hrs, or 0.5 hr to 75 hrs, or 1 hr to 50 hrs, or 2 hrs to 40 hrs, or 4 hrs to 35 hrs, or 6 hrs to 30 hrs, or 8 hrs to 25 hrs, or 10 hrs to 25 hrs, or 4 hrs to 64 hrs, or 8 hrs to 32 hrs, or 4 hrs to 32 hrs, or 4 hrs to 16 hrs, or 8 hrs to 64 hrs, or 16 hrs to 64 hrs, or 32 hrs to 64 hrs, or any intervening value or range disclosed therein. In some examples, the heat treatment may be conducted at a time of 1 min, 0.1 hr, or 0.5 hr, or 1 hr, or 2 hrs, or 4 hrs, or 6 hrs, or 8 hrs, or 10 hrs, or 12 hrs, or 14 hrs, or 16 hrs, or 20 hrs, or 24 hrs, or 28 hrs, or 32 hrs, or 36 hrs, or 40 hrs, or 44 hrs, or 48 hrs, or 52 hrs, or 56 hrs, or 60 hrs, or 64 hrs, or 72 hrs, or 80 hrs, or 88 hrs, or 96 hrs, or 100 hrs, or 120 hrs, or 140 hrs, or 160 hrs, or 180 hrs, or 200 hrs, or any intervening value disclosed therein.

In some examples, any temperature or temperature range is selected independently of any time or time range. For example, the heat treatment may be conducted at a temperature of 700° C. for 64 hrs, or 750° C. for 32 hrs, or 800° C. for 16 hrs, or 850° C. for 8 hrs, or 900° C. for 4 hrs, etc.

In a second etch treatment step, the phase-separated cladding layers 104c and 104d and core layer 102 are subjected to a liquid or vapor etching.

Step 2—Etch Treatment

The etch treatment may be conducted as follows. Two volume percent (2 vol. %) hydrogen fluoride (HF) solution was prepared. Samples were taped off on one side to perform a one-sided etch. Some samples were etched in a volume of HF solution for various times (e.g., 30 sec), then rinsed with deionized (DI) water, and dried with compressed nitrogen.

In some examples, a wet chemical etch is conducted using a suitable component capable of degrading or dissolving the glass article. For example, the suitable wet etching chemical includes an acid (e.g., $HCl$, $HNO_3$, $H_2SO_4$, $H_3PO_4$, $H_3BO_3$, $HBr$, $HClO_4$, $HF$, acetic acid, citric acid, $NH_4F$, ammonium bifluoride acid), a base (e.g., $LiOH$, $NaOH$, $KOH$, $RbOH$, $CsOH$, $Ca(OH)_2$, $Sr(OH)_2$, $Ba(OH)_2$), $H_2O$, or a combination thereof. In some examples, the wet chemical etchant has a concentration in a range of 0.1 vol. % to 10 vol. %, or 0.2 vol. % to 9 vol. %, or 0.3 vol. % to 8 vol. %, or 0.4 vol. % to 7 vol. %, or 0.5 vol. % to 6 vol. %, or 0.6 vol. % to 5 vol. %, or 0.25 vol. % to 5 vol. %, or 0.25 vol. % to 3 vol. %, or 0.25 vol. % to 2 vol. %, or any intervening value or range disclosed therein.

In some examples, the wet chemical etchant has a concentration of 0.1 vol. %, or 0.15 vol. %, or 0.2 vol. %, or 0.25 vol. %, or 0.3 vol. %, or 0.35 vol. %, or 0.4 vol. %, or 0.45 vol. %, or 0.5 vol. %, or 0.55 vol. %, or 0.6 vol. %, or 0.65 vol. %, or 0.7 vol. %, or 0.75 vol. %, or 0.8 vol. %, or 0.85 vol. %, or 0.9 vol. %, or 0.95 vol. %, or 1 vol. %, or 1.1 vol. %, or 1.2 vol. %, or 1.3 vol. %, or 1.4 vol. %, or 1.5 vol. %, or 1.6 vol. %, or 1.7 vol. %, or 1.8 vol. %, or 1.9 vol. %, or 2 vol. %, or 2.25 vol. %, or 2.5 vol. %, or 3 vol. %, or 3.5 vol. %, or 4 vol. %, or 4.5 vol. %, or 5 vol. %, or 6 vol. %, or 7 vol. %, or 8 vol. %, or 9 vol. %, or 10 vol. %, or any intervening value disclosed therein.

In some examples, a dry etch process is conducted at least one of ion beam etching, plasma etching, reactive ion etching, or combinations thereof, using suitable gases therein such as oxygen-, nitrogen-, halogen-, or fluorine-containing, or a combination thereof.

In some examples, the etch treatment may be conducted at a time in a range of 1 sec to 24 hrs, 5 sec to 20 hrs, 10 sec to 16 hrs, 20 sec to 12 hrs, 30 sec to 8 hrs, 45 sec to 4 hrs, or any intervening value or range disclosed therein. In some examples, the etch treatment may be conducted at a time in a range of 1 sec to 300 sec, or 5 sec to 250 sec, or 10 sec to 200 sec, or 20 sec to 150 sec, or 10 sec to 120 sec, or 20 sec to 120 sec, or 30 sec to 120 sec, or 45 sec to 120 sec, or 60 sec to 120 sec, or 90 sec to 120 sec, or any intervening value or range disclosed therein. In some examples, the etch treatment may be conducted at a time of 1 sec, or 5 sec, or 10 sec, or 20 sec, or 30 sec, or 45 sec, or 60 sec, or 75 sec, or 90 sec, or 105 sec, or 120 sec, or 150 sec, or 180 sec, or 210 sec, or 240 sec, or 270 sec, or 300 sec, 4 hrs, or 8 hrs, or 12 hrs, or 16 hrs, or 20 hrs, or 24 hrs, or any intervening value disclosed therein.

In some examples, any etchant is selected independently of any time or time range and concentration or concentration range. For example, the etch treatment may be conducted as a wet chemical etch using 0.5 vol. % HF, etc.

Thus, in Step 2 after phase separation, glass samples are etched to form porous surface structures with channel widths determined by the size of silica-poor phase regions and heat-treatment conditions. In other words, the etch treatment produces a graded glass index on the order of greater than 5 nm (e.g., 50 nm) or 1 nm to 100 nm, or 100 nm to 1 μm, or 1 μm to 5 μm by removal of boron or other elements near the clad glass/air interface.

By the etch treatment described herein, the boron-rich phase is removed. So as long as phase separation creates two phases where one etches at a preferentially higher or lower rate, the etch treatment may be able to preferentially target specific elements of the cladding composition. However, preferential etching is glass dependent. For example, in borosilicate glasses, typically the boron matrix etches faster than the silicate matrix. In other systems without boron (e.g., aluminosilicate glass), phase separation occurs specific to their unique chemistries.

Figure 3A:
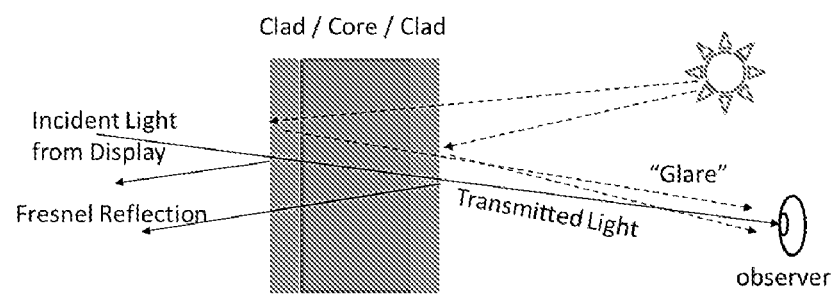
FIGS. 3A and 3B illustrate transmission and Fresnel reflections of incident light through cover glass prior to the treatment in FIG. 2 (FIG. 3A) and post-treatment (FIG. 3B), according to some embodiments.
Figure 3B:
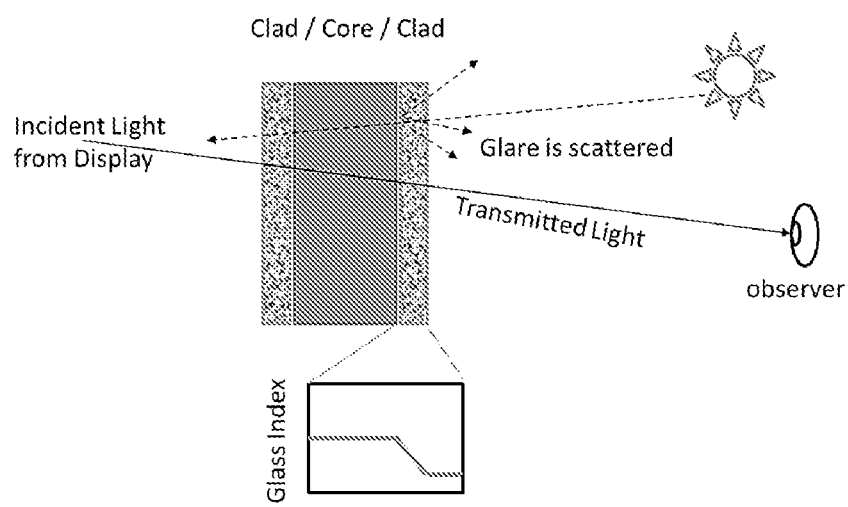

FIGS. 3A and 3B illustrate transmission and Fresnel reflections of incident light through cover glass prior to the treatment in FIG. 2 (FIG. 3A) and post-treatment (FIG. 3B), according to some embodiments. Approximately 8% of incident light is due to Fresnel reflections occurring at the clad glass/air interface as a result of refractive index changes of the two mediums. For an observer of a display undergoing the Fresnel effect, a lowered transmission of light coming from the display adversely affects the viewing experience. This is compounded should there be ambient light external to the display that interferes with the transmitted light (i.e., "glare"). The FIG. 3A schematic exemplifies reduced display visibility resulting from lowered transmission of incident light and increased glare.

FIG. 3B shows the optical behavior of the phase separated glass after the heat treatment of Step 1 and the etch treatment of Step 2. Incident light from the display is able to pass through (i.e., transmit) with negligible reflection (i.e., minimized Fresnel reflection). Based on the grain size of the phase-separated cladding glass layer (104c and 104d of FIG. 2), optical properties such as lowered glare or enhanced haze and clarity may be optimized for an observer viewing the display and depending on the application. In some examples, specific cladding glass compositions and heat treatment conditions can produce phase-separated glass with grain sizes in a range of 1 nm to 10 μm, or 10 nm to 1 μm, or 100 nm to 500 nm, or any intervening value or range disclosed therein.

As explained above and shown in FIG. 3B, for display applications, ambient light reflected at the clad glass/air interface reflects back to the observer, creating glare. After processing through Step 2, and at least partially due to grain size of the phase-separated cladding glass layer, ambient light is able to pass predominantly through the glass and back-reflections due to reflections from internal display components are scattered to a certain degree in the phase-separated regime for reduced glare.

EXAMPLES

Example 1—Confirmation of Phase Separation

FIGS. 4A-4F illustrate images of the cladding portion of the laminate after heat treatment at various times and temperatures (after Step 1 from above), according to some embodiments. Heat treatments were tested at 700° C. for 64 hrs (FIG. 4B), 750° C. for 32 hrs (FIG. 4C), 800° C. for 16 hrs (FIG. 4D), 850° C. for 8 hrs (FIG. 4E), and 900° C. for 4 hrs (FIG. 4F). The control sample (FIG. 4A) was not subjected to a heat treatment.

As temperature increases from 700° C. to 900° C., the distinction in the separated glass phases also increases, as shown by the milky halo caused by scattering of light. As temperature increases, the extent of phase separation also increases, as is evident from the larger "grain" sizes. As the length-scale of the two phases increases, this causes optical scattering to occur and results in a non-transparent glass, known as the milky/halo effect. Thus, it is desired to maintain the extent of phase separation minimal such that the glass sample remains transparent.

FIGS. 5A-5E illustrate SEM images of phase separation in the cladding portion of the laminate after heat treatment at various times and temperatures (after Step 1 from above), according to some embodiments. Scanning electron microscopy (SEM) images were obtained by a scanning electron microscope (Zeiss Gemini 500). Samples were heat-treated for 1 hr to explore the role of temperature on phase separation of the glass composition. Phase separation was found to be much smaller than the wavelength of light (e.g., <100 nm) could provide the optical benefit we observe.

Based on the data of FIGS. 4A to 5E, it was determined that in some examples, the optimal temperature and time of the heat treatment (Step 1) is 800° C. for 20 min.

Example 2—Characterization

Transmittance (%) and transmitted haze measurements were conducted using a Ci7860 X-Rite Spectrophotometer (with an incident light angle of 8°) using the standards defined in at least one of CIE No 15, ASTM D1003, ISO 7724/1. DOI and gloss measurements were conducted using a Rhopoint IQ gloss meter using the standards defined in at least one of ASTM E430 (for DOI) and for gloss (measured at 20°, 60°, and 85° angles): ISO 2813, ISO 7668, ASTM D523, ASTM D2457, DIN 67530, JIS 8741, JIS K 5600-4-7.

Figure 6A:
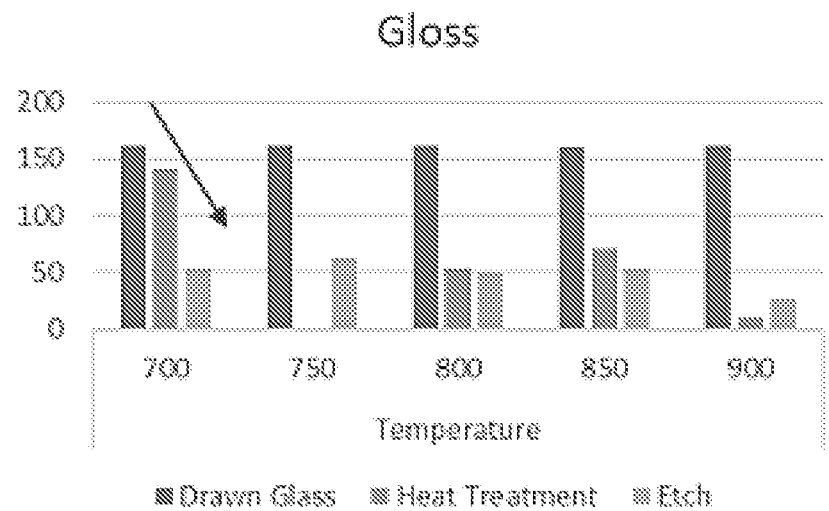
FIGS. 6A-6D illustrate optical property measurements of the laminate as a function of temperature conditions in the heat treatment step and the etch step, according to some embodiments.
Figure 6B:
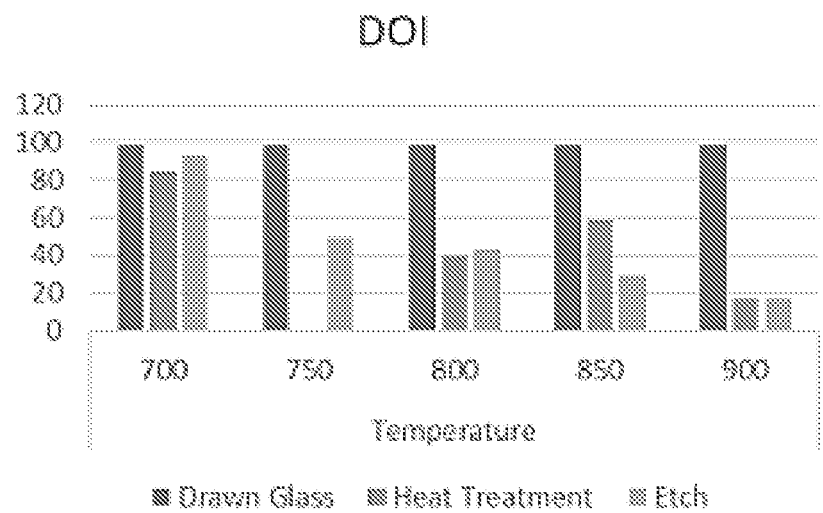
Figure 6C:
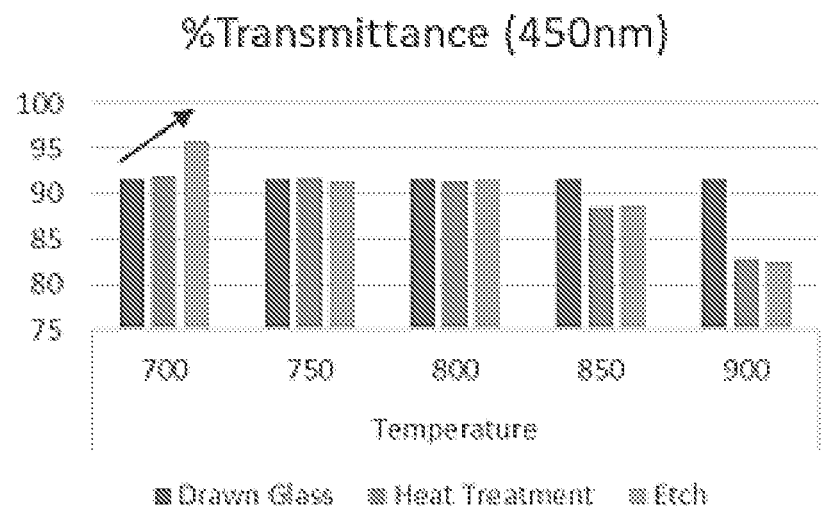
Figure 6D:
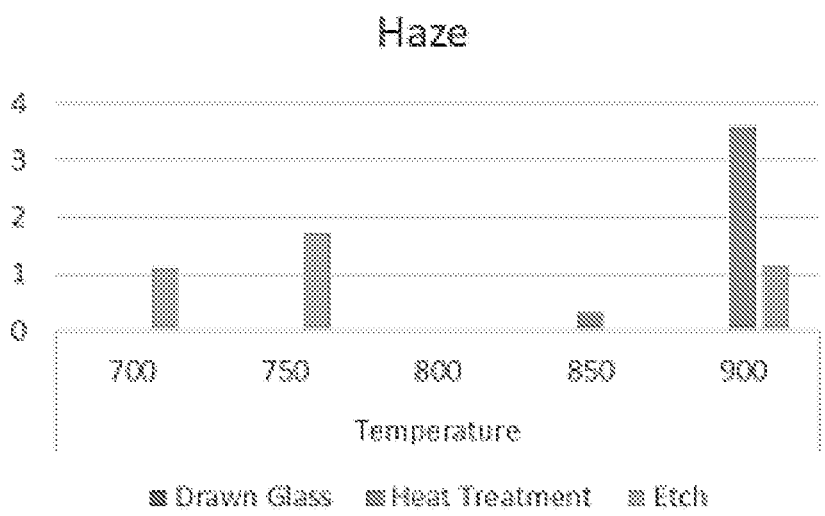

FIGS. 6A-6D illustrate optical property measurements of the laminate as a function of temperature conditions in fusion-drawing the laminate (drawn glass), the heat treatment step, and the etch step, according to some embodiments. Broadly speaking, to identify whether a glass surface has anti-reflective or anti-glare capabilities, % transmittance should increase from the drawn glass to the etch step, while gloss and DOI should decrease. As FIGS. 6A and 6C indicates, a heat treatment at 700° C. for 64 hrs results in the most pronounced increase in % transmittance (~92% (or 8% reflectance) to ~96% transmittance (or 4% reflectance)) and reduced gloss (arbitrary gloss units). A decrease in DOI is also observed at a heat treatment at 700° C. for 64 hrs. At temperatures greater than 700° C., even with substantial decreases in both gloss and DOI, either no appreciable increase is observed for % transmittance (e.g., at 750° C. and 800° C.) or % transmittance, in fact, decreases (e.g., at 850° C. and 900° C.). As shown in FIG. 6D, haze values tested at 700° C. to 900° C. were less than 2%.

Figure 7:
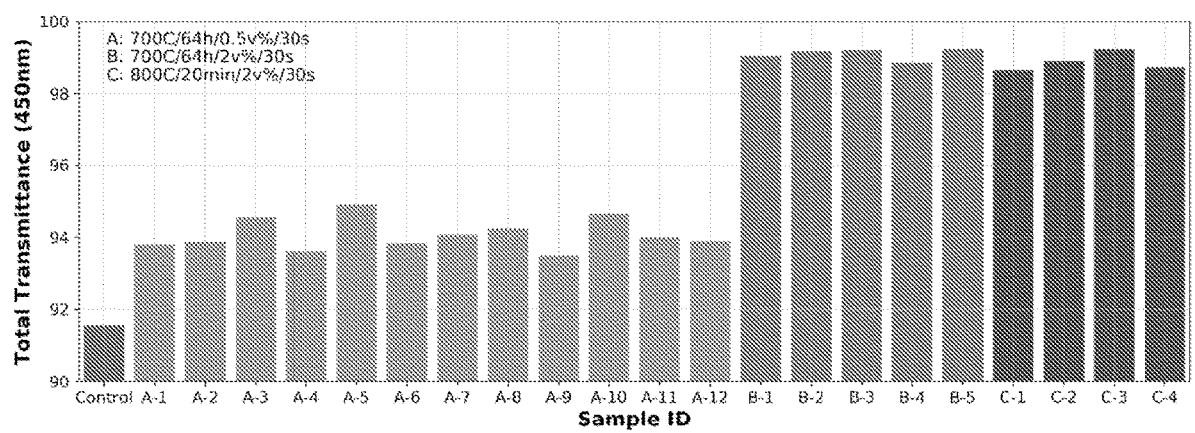
FIG. 7 illustrates total transmittance (%) for control sample and test samples heat treated at 700° C. for 64h, followed by etching with 2 vol. % HF for 30 sec, according to some embodiments.

To further validate the observed measurement, FIG. 7 shows total transmittance (%) for a control sample and multiple (21) test samples subjected to heat treatment at 700° C. for 64h (for samples A-1 to A-12 and B-1 to B5) or 800° C. for 20 min (for samples C-1 to C-4), followed by etch treatment with 0.5 vol. % HF for 30 sec (for samples A-1 to A-12) or 2.0 vol. % HF for 30 sec (for samples B-1 to B-5 and C-1 to C-4). On average, samples A-1 to A-12 had a total transmittance of close to 94% while samples B-1 to B-5 and C-1 to C-4 had a total transmittance of close to 99%. All samples had a total transmittance much greater than the control sample (~91.5%).

FIGS. 8A-8D illustrate total transmittance (%) and distinctness of image (DOI) as a function of etch time and acid concentration, according to some embodiments. In other words, to determine whether etching conditions influence optical performance (e.g., % transmittance) over native glass, (i) etch time was varied for 0.5 vol. % HF acid concentration etchant and (ii) acid concentration was varied for 30 sec of etch time.

Figure 8A:
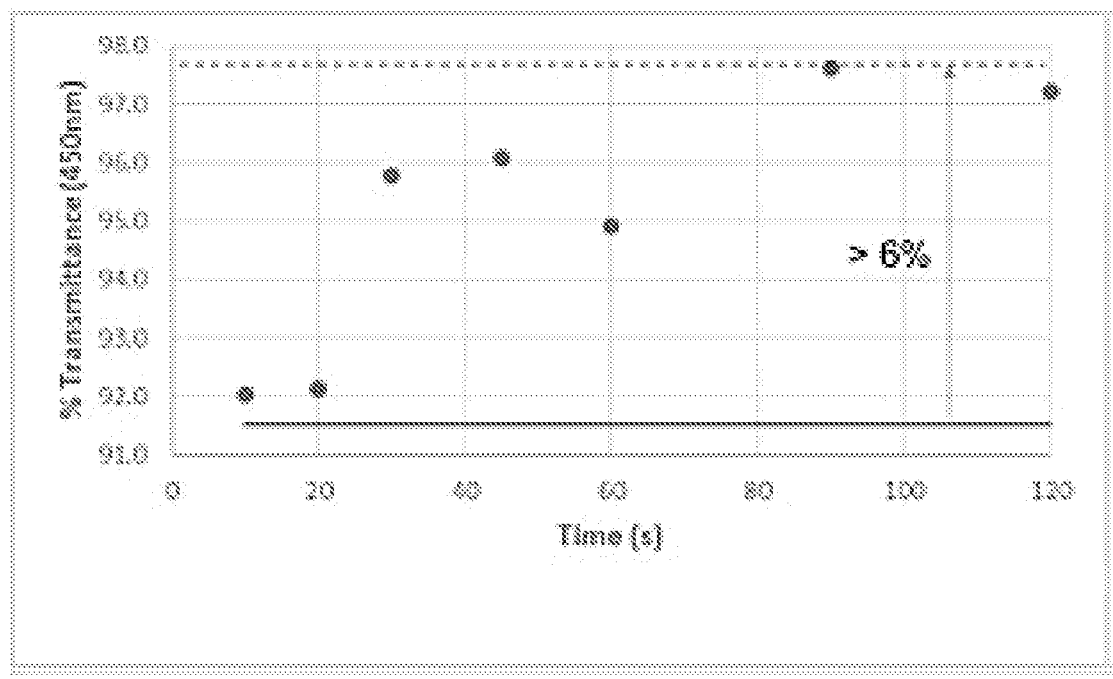
FIGS. 8A-8D illustrate total transmittance (%) and distinctness of image (DOI) as a function of etch time and acid concentration, according to some embodiments.
Figure 8B:
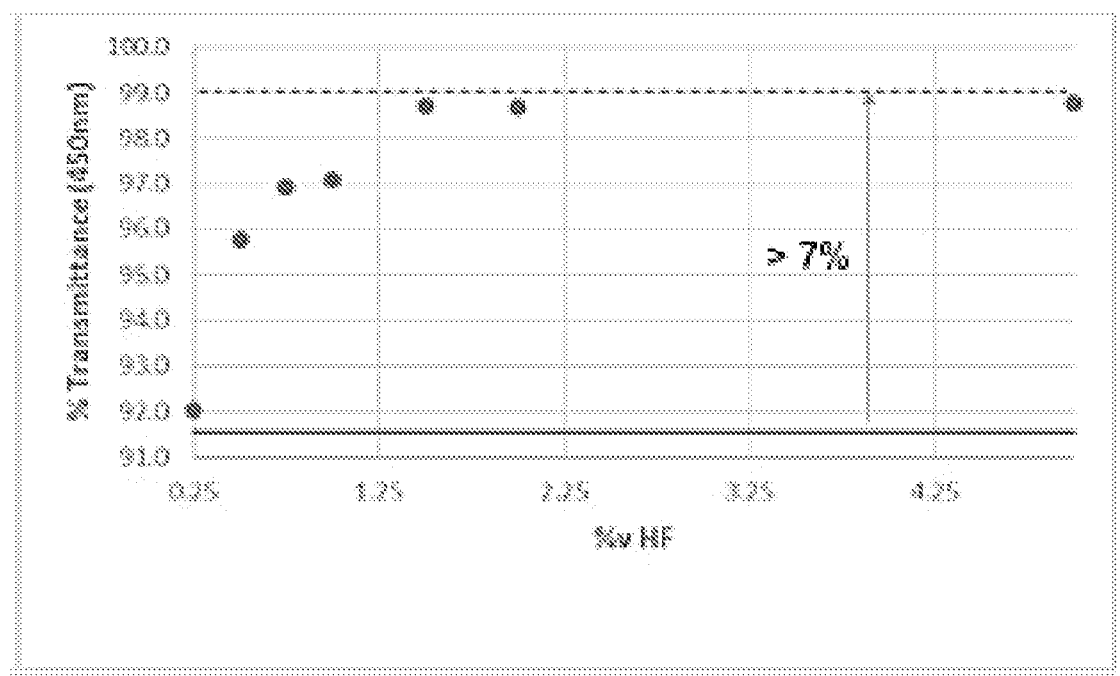
Figure 8C:
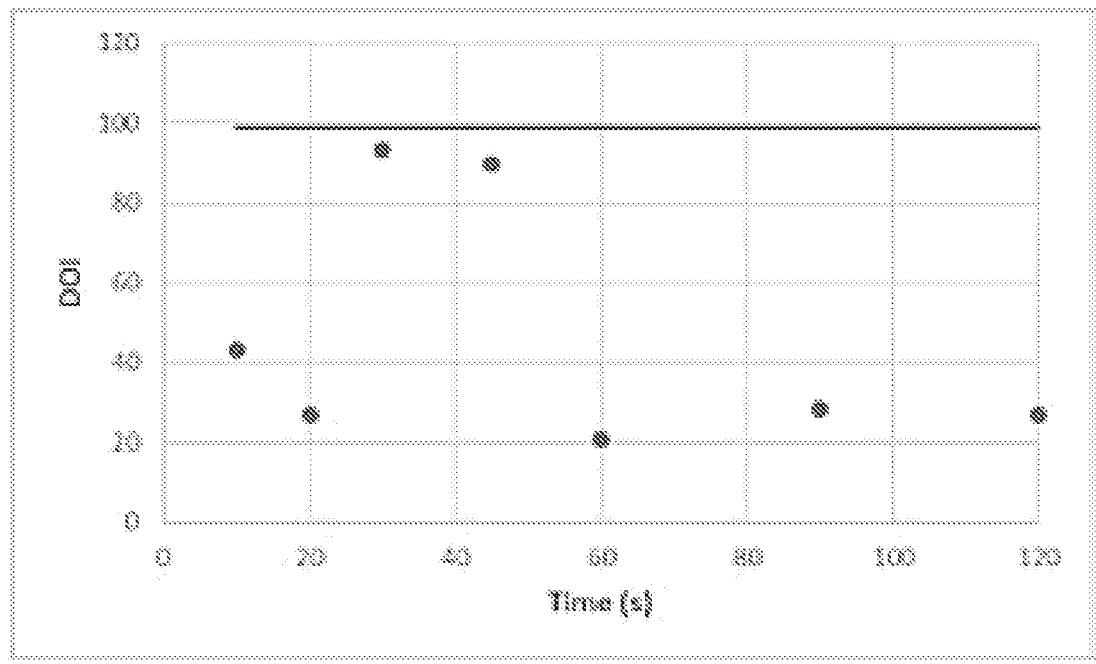
Figure 8D:
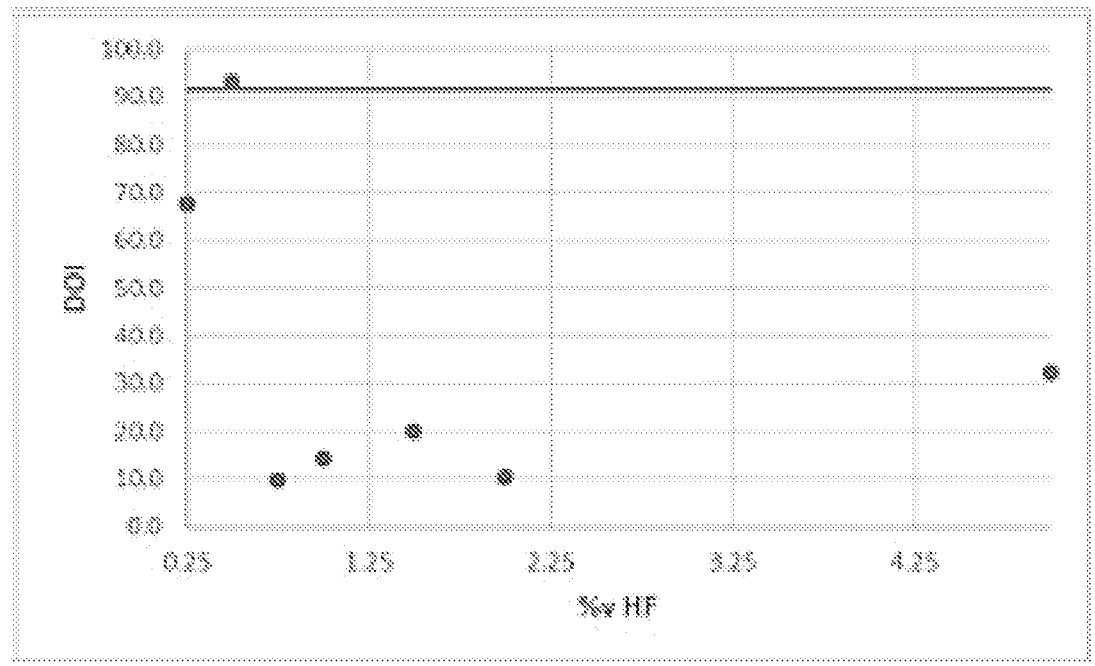

From FIGS. 8A and 8B, it is seen that performance of the etch treatment of Step 2, regardless of a particular etch time (as in FIG. 8A) or a particular acid concentration (as in FIG. 8B), is likely to result in a higher % transmission than the control sample. For example, transmission improves in a range of 0.5% (with an etch time of 10-20 sec) to about 6% (with an etch time of 90 sec). From FIG. 8B, transmission improves in a range of 0.5% (at a 0.25 vol. % HF) to about 7% (at HF above about 1.50 vol. %). With respect to DOI, most etch times and acid concentrations are likely to result in a lower DOI than the control sample. For example, DOI decreases at all etch times in a range of 10 sec to 120 sec (FIG. 8C) and most HF concentrations (FIG. 8D). Based on the data of FIGS. 8A to 8D, it was determined that in some examples, the optimal concentration and time of the etch treatment (Step 2) is 2 vol. % for 30 sec to minimize time and cost.

These results indicate transmittance greater than 98% and DOI less than 30% may be achieved by controlling (A) heat treatment temperature and time, and (ii) etch time and acid concentration. The ability to regulate process parameters allows the solution to scaled at the production level.

Example 3—Phase-Separated Cladding and Core Layers

In some examples, both the cladding and core layer are able to undergo phase-separation due to the heat treatment of Step 1. In this instance, the grain size of the cladding glass layer and the core glass layer may be the same or different, depending on desired optical performance of the end application. For example, the cladding layer may comprise a smaller grain size than the core layer after Step 2 to result in a graded index anti-reflection, while maintaining or enhancing scratch resistance surfaces. The core layer with the longer path length may be used to control glare or haze.

Thus, as presented herein, this disclosure relates to improved anti-reflection (AR) and anti-glare (AG) glass laminates having enhanced optical performance in display applications. Advantages of the formed AR/AG glass laminates include: (1) ability to simultaneously achieve anti-reflection and anti-glare behavior; (2) using a single-layer material to function as a broadband filter, effectively reducing reflections across the entire visible spectrum; (3) providing a highly-durable, scratch-resistant, glass-based solution that is environmentally friendly; (4) strength without any additional IOX process due to coefficient of thermal expansion (CTE) mismatch between core and cladding of the laminate; (5) hot formed to allow a variety of 3D shapes to be made with a uniform optical coating; (6) optimized haze, glare, clarity, and transmission based on application end use.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A glass-based article, comprising:
a core, wherein the core comprises phase-separated glass or glass-ceramic; and
a cladding overlaying the core, wherein the cladding comprises glass or glass-ceramic;
wherein the cladding comprises porous surface structures with channels.

2. The glass-based article of claim 1, wherein the article has a transmission of at least 96% therethrough.

3. The glass-based article of claim 1, wherein thickness of the core is in a range of 1 μm to 200 μm.

4. The glass-based article of claim 1, wherein thickness of the cladding is in a range of 50 μm to 1000 μm.

5. The glass-based article of claim 1, wherein a composition of the core in terms of oxide constituents comprises silica ($SiO_2$), alumina ($Al_2O_3$), and boria ($B_2O_3$).

6. The glass-based article of claim 5, wherein the composition further comprises alkali metal oxides and alkaline earth metal oxides.

7. The glass-based article of claim 5, wherein the composition of the core comprises the boria in a range of 5-23 wt %.

8. The glass-based article of claim 5, wherein the composition of the core comprises the silica in a range of 45-75 wt %.

9. The glass-based article of claim 5, wherein the composition of the core comprises the alumina in a range of 8-19 wt %.

10. The glass-based article of claim 1, wherein the phase-separated glass or glass-ceramic has a grain size in a range of 10 nm to 1 μm.

11. The glass-based article of claim 1, wherein the cladding is a phase-separated cladding overlaying the core, the cladding comprising glass;
wherein the glass-based article has a % transmission of at least 96%, and
wherein the cladding comprises a grain size in a range of 10 nm to 1 μm.

12. The glass-based article of claim 11, wherein the core comprises phase-separated glass.

13. The glass-based article of claim 12, wherein a grain size of the phase-separated cladding is less than a grain size of the phase-separated core.

14. The glass-based article of claim 11, wherein the glass-based article has a % transmission of at least 98% and a distinctness of image of less than 30%.

15. The glass-based article of claim 11, wherein the cladding has a graded glass index in a range of 1 μm to 5 μm.

16. The glass-based article of claim 11, wherein the cladding has an average coefficient of thermal expansion different from an average coefficient of thermal expansion of the core.

17. The glass-based article of claim 1,
wherein the phase-separated glass or glass-ceramic has a grain size in a range of 10 nm to 1 μm;
wherein a composition of the core in terms of oxide constituents comprises silica ($SiO_2$), alumina ($Al_2O_3$), and boria ($B_2O_3$); and
wherein the composition of the core comprises the boria in a range of 5-23 wt %;
wherein the cladding has thickness in a range of 50 μm to 1000 μm.

18. The glass article of claim 17, wherein thickness of the core is in a range of 1 μm to 200 μm.

19. The glass article of claim 18, wherein the article has a transmission of at least 96% therethrough.

20. The glass article of claim 17, wherein article is 3D shaped and comprises a uniform coating.

\* \* \* \* \*